(12) United States Patent
Lu

(10) Patent No.: US 8,590,106 B2
(45) Date of Patent: Nov. 26, 2013

(54) SLIDING HINGE AND A REMOTE CONTROL WITH THE SLIDING HINGE

(75) Inventor: Chun-Jen Lu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 1184 days.

(21) Appl. No.: 12/495,760

(22) Filed: Jun. 30, 2009

(65) Prior Publication Data

US 2010/0325837 A1 Dec. 30, 2010

(51) Int. Cl.
*E05F 1/08* (2006.01)
(52) U.S. Cl.
USPC ............................................. 16/308; 16/362
(58) Field of Classification Search
USPC ............... 16/9, 277, 284, 327, 352, 353, 359, 16/361, 362, 308
See application file for complete search history.

(56) References Cited

U.S. PATENT DOCUMENTS

| 2006/0211460 A1* | 9/2006 | Jeong et al. | 455/575.4 |
| 2008/0120806 A1* | 5/2008 | Liu | 16/277 |
| 2008/0301909 A1* | 12/2008 | Chien et al. | 16/362 |

* cited by examiner

*Primary Examiner* — Roberta Delisle
(74) *Attorney, Agent, or Firm* — Alan Kamrath; Kamrath IP Lawfirm, P.A.

(57) ABSTRACT

A remote control has lower and upper casings. A sliding hinge has a main bracket attached to the lower casing, a sliding bracket attached to the upper casing, two positioning assemblies mounted between the main bracket and the sliding bracket, multiple fasteners mounted through the sliding bracket, the positioning assemblies and elongated slots of the main bracket and two resilient components connected to the main bracket and the fasteners. The resilient components push the sliding bracket and selectively retain the sliding bracket securely at opposite ends of the elongated slots of the main bracket. The lower and the upper casings of the remote control do not collide with each other or with the main and the sliding brackets and therefore prevent localized wear.

16 Claims, 6 Drawing Sheets

SLIDING HINGE AND A REMOTE CONTROL WITH THE SLIDING HINGE

BACKGROUND OF THE INVENTION

1. Field of the Invention

The present invention relates to a sliding hinge and a remote control with the sliding hinge, especially to a siding hinge that is disposed between an upper casing and a lower casing of the remote control to allow the upper casing to slide relative to the lower casing.

2. Description of the Prior Art(s)

With the development of the electronics industry, electronic devices have light and convenient shapes, but may perform a variety of complicated functions. A small-sized electronic device has an upper casing with a monitor and lower casing with a keyboard. The upper and the lower casings may be folded to reduce a footprint of the electronic device. A hinge is mounted between the lower and the upper casings to allow the upper casing to pivot relative to the lower casing. Moreover, a sliding hinge is mounted between the lower and the upper casings to allow the upper casing to slide relative to the upper casing.

With reference to FIG. 6, a conventional sliding hinge (80) is mounted on an electronic device (70).

The electronic device (70) has an upper casing (71) and a lower casing (72). The upper casing (71) has a mounting recess (711) formed in an inner surface of the upper casing (71) and two sliding recesses (712) formed in the inner surface of the upper casing (71), respectively adjacent to two opposite sides of the mounting recess (711) and communicating with the mounting recess (711).

The sliding hinge (80) has a main panel (81), a sliding panel (82) and a spring (83). The main panel (81) is securely mounted in the mounted recess (711) of the upper casing (71) and has two grooves (811) respectively formed in two opposite sides of the main panel (81). The sliding panel (82) is securely mounted on the lower casing (72) and has two guiding bars (821) and two ribs (822). The guiding bars (821) are formed respectively on two opposite sides of the sliding panel (82) and are mounted respectively in the sliding recesses (712) of the upper casing (71). The ribs (822) are formed respectively on inner surfaces of the guiding bars (821) and respectively engage the grooves (811) of the main panel (81). The spring (83) is mounted between the main panel (81) and the sliding panel (82) and has two ends respectively connected pivotally to the main and the sliding panels (81, 82). As the upper and lower casings (71, 72) and the main and sliding panels (81, 82) slide relatively, the ribs (822) of the sliding panel (82) slide along the grooves (811) of the main panel (81). The spring (83) pushes the sliding panel (82) together with the lower casing (72) selectively retaining the sliding panel (82) and the lower casing (72) at two ends of the sliding recesses (712) of the upper casing (71). Consequently, the upper casing (71) is open or closed relative to the lower casing (72).

However, since no positioning mechanisms is designed between the main and the sliding panels (81, 82) of the electronic device (80), the upper and the lower casings (71, 72) stop sliding relative to each other when the guiding bars (821) of the sliding panel (82) collide with the ends of the guiding recesses (712) of the upper casing (71). Accordingly, the upper casing (71) is damaged easily.

To overcome the shortcomings, the present invention provides a sliding hinge and a remote control with the sliding hinge to mitigate or obviate the aforementioned problems.

SUMMARY OF THE INVENTION

The main objective of the present invention is to provide a sliding hinge and a remote control with the sliding hinge.

The remote control has lower and upper casings. The sliding hinge has a main bracket attached to the lower casing, a sliding bracket attached to the upper casing, two positioning assemblies mounted between the main bracket and the sliding bracket, multiple fasteners and two resilient components. The fasteners are mounted through the sliding bracket, the positioning assemblies and elongated slots of the main bracket. The resilient components are connected to the main bracket and the fasteners.

The resilient components push the sliding bracket and selectively retain the sliding bracket securely at opposite ends of the elongated slots of the main bracket. The lower and the upper casings of the remote control do not collide with each other or with the main and the sliding brackets and therefore wear is improved.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
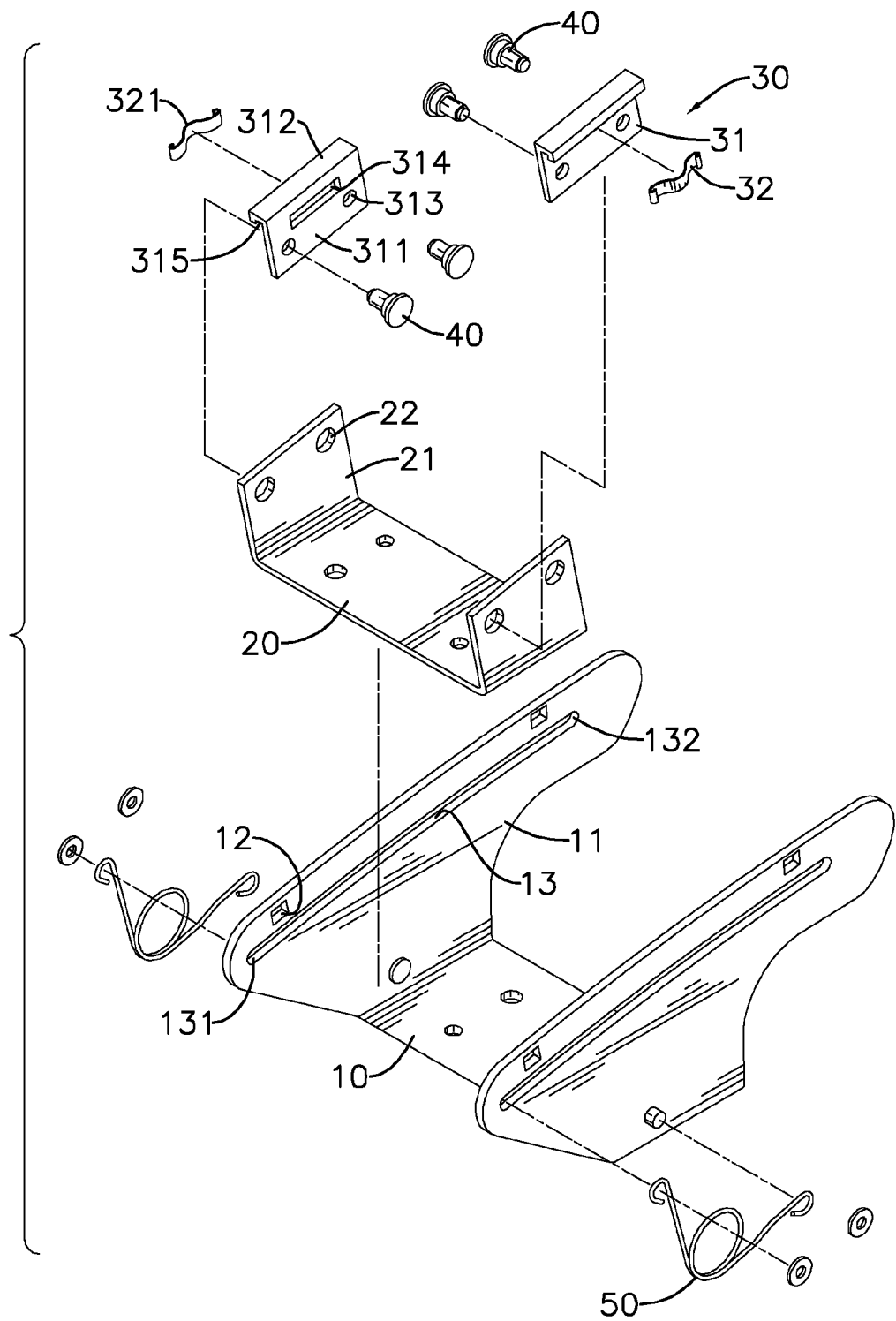
FIG. 1 is an exploded perspective view of a sliding hinge in accordance with the present invention.
Figure 2:
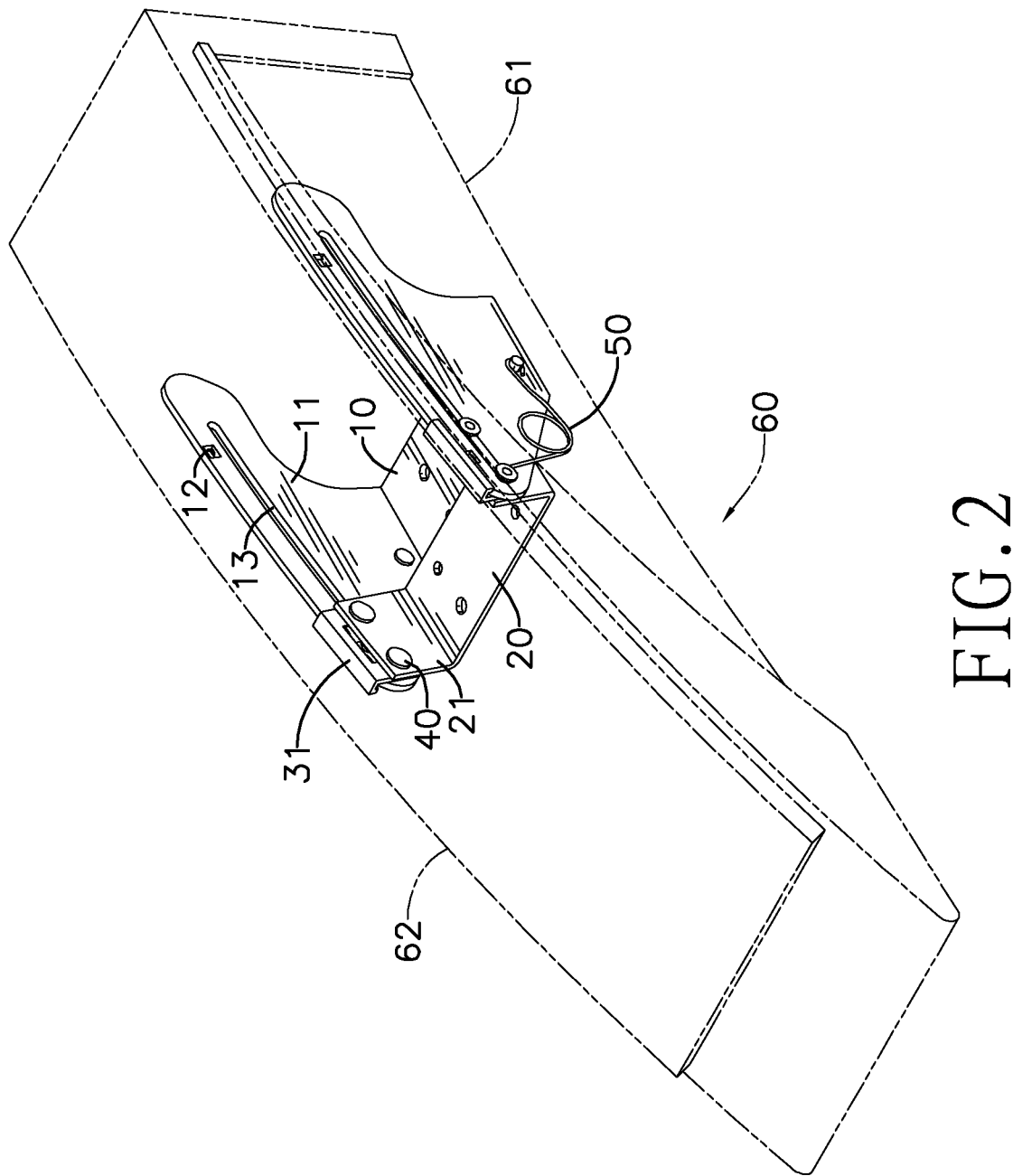
FIG. 2 is a perspective view of a remote control with the sliding hinge in accordance with the present invention, an upper casing and a lower casing of the remote control in phantom lines.

With reference to FIGS. 1 and 2, a remote control (60) in accordance with the present invention comprises a lower casing (61), an upper casing (62) and a sliding hinge in accordance with the present invention. The sliding hinge comprises a main bracket (10), a sliding bracket (20), two positioning assemblies (30), multiple fasteners (40) and two resilient components (50).

The main bracket (10) may be attached to the lower casing (61) of the remote control (60) and has a U-shaped cross-section and two opposite stationary wings (11). Each stationary wing (11) has at least one positioning detent (12) and an elongated slot (13). The at least one positioning detent (12) is formed in an inner surface of the stationary wing (11) and may be formed through the stationary wing (11). The elongated slot (13) is formed through the stationary wing (11), adjacent to and along a distal edge of the stationary wing (11) and has a first end (131) and a second end (132).

The sliding bracket (20) may be attached to the upper casing (62) of the remote control (60), is mounted slidably between the stationary wings (11) of the main bracket (10) and has a U-shaped cross-section and two opposite sliding wings (21). Each sliding wing (21) has at least one mounting hole (22). The at least one mounting hole (22) is formed through the sliding wing (21) and corresponds to the elongated slot (13) of a corresponding stationary wing (11) of the main bracket (10).

The positioning assemblies (30) are mounted respectively between the stationary wings (11) of the main bracket (10) and the sliding wings (21) of the sliding bracket (20). Each positioning assembly (30) has at least one connecting panel (31) and at least one resilient leaf (32). The at least one connecting panel (31) has a connector (311) and may have a guiding protrusion (312).

The connector (311) is mounted between a corresponding stationary wing (11) of the main bracket (10) and a corresponding sliding wing (21) of the sliding bracket (20) and has an outer surface, at least one through hole (313) and at least one mounting recess (314). The outer surface of the connector (311) of the connecting panel (31) corresponds to the corresponding stationary wing (11) of the main bracket (10). The at least one through hole (313) is formed through the connector (311) of the at least one connecting panel (31), corresponds to the elongated slot (13) of a corresponding stationary wing (11) and aligns with a corresponding mounting hole (22) of the corresponding sliding wing (21). The at least one mounting recess (314) is formed in the outer surface of the connector (311) of the connecting panel (31) and may be formed through the connector (311) of the connecting panel (31).

The guiding protrusion (312) is formed on a distal edge toward the outer surface of the connector (311), is mounted on and slides along the distal edge of the corresponding stationary wing (11) of the main bracket (10) and may have a guiding recess (315). The guiding recess (315) is formed in a lower surface of the guiding protrusion (312) and is mounted around the distal edge of the corresponding stationary wing (11).

Figure 5:
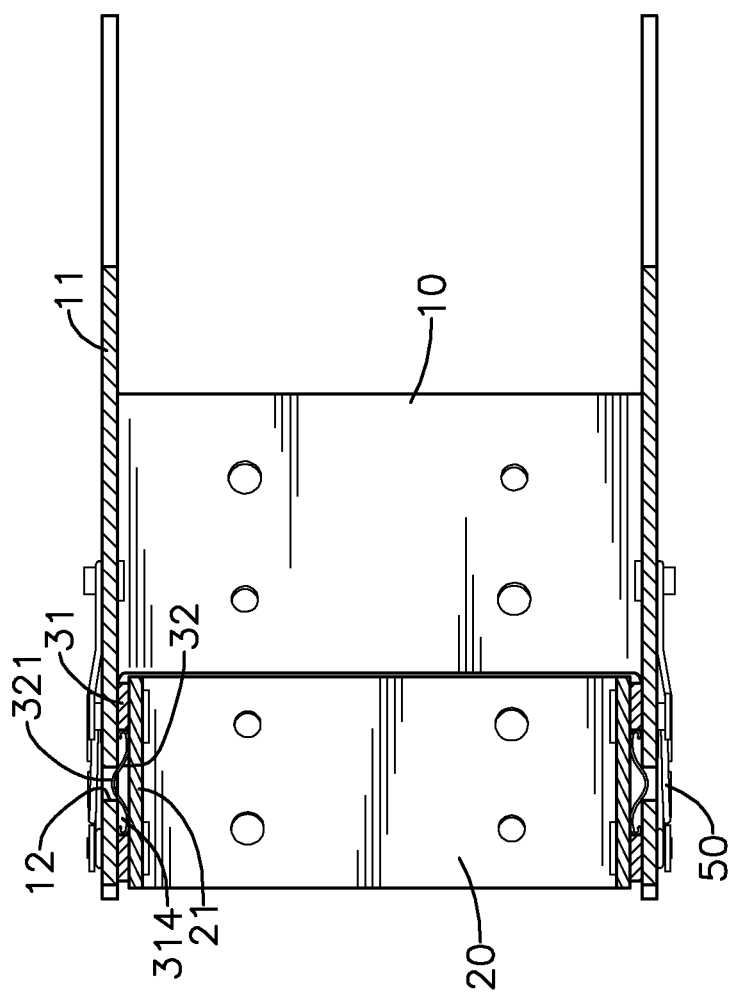
FIG. 5 is a cross-sectional upper view of the sliding hinge in FIG. 1.
Figure 6:
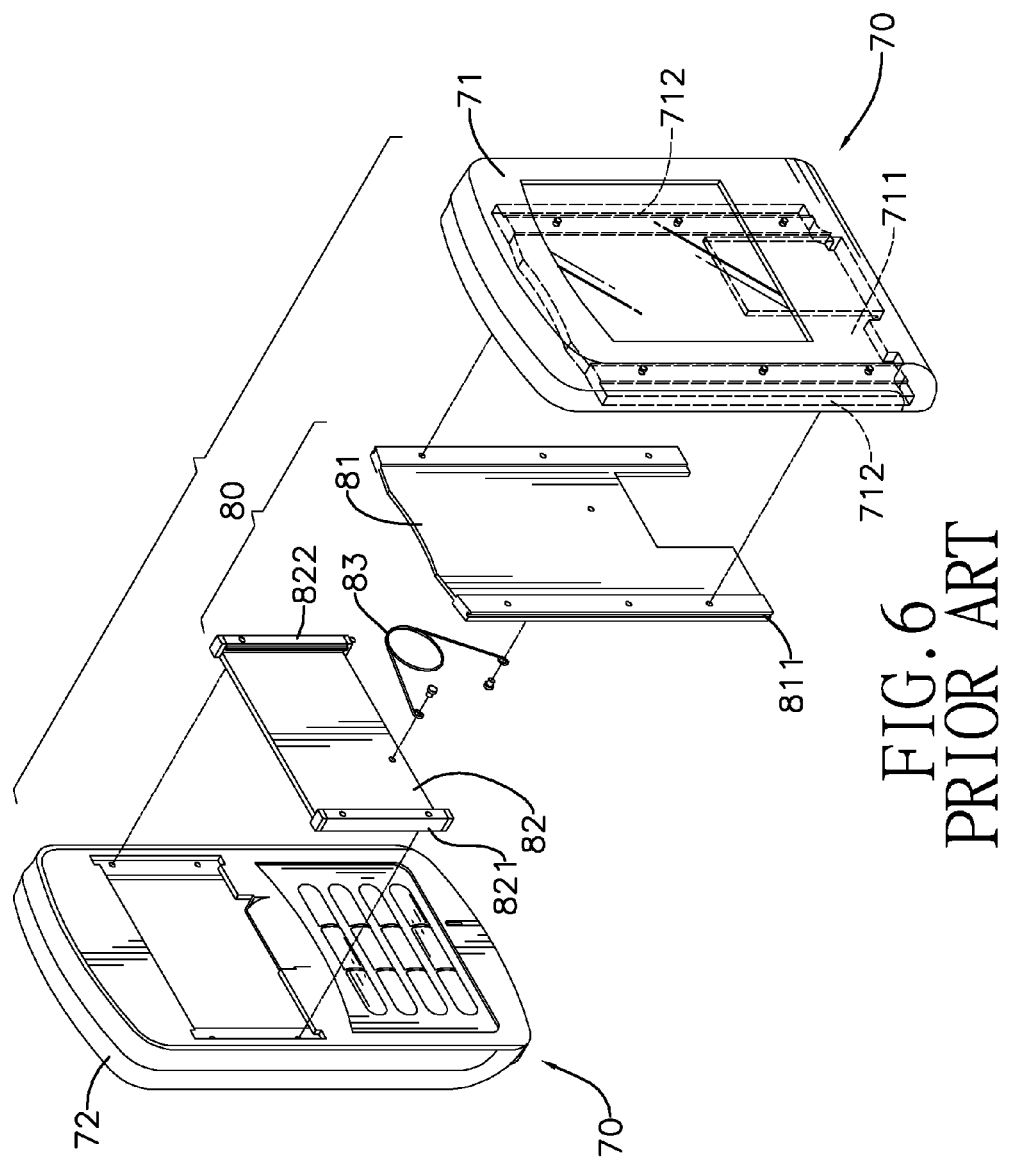
FIG. 6 is an exploded perspective view of an electronic device with a conventional sliding hinge in accordance with the prior art.

With further reference to FIG. 5, the at least one resilient leaf (32) is mounted in the mounting recess (314) of the at least one connecting panel (31) and has a positioning protrusion (321). The positioning protrusion (321) protrudes toward the corresponding stationary wing (11) of the main bracket (10) and selectively engages the at least one positioning detent (12) of the corresponding stationary wing (11) of the main bracket (10).

The fasteners (40) are mounted respectively through the mounting holes (22) of the sliding bracket (20), the through holes (313) of the connecting panels (31) of the positioning assemblies (30) and the elongated slots (13) of the main bracket (10) to allow the sliding bracket (20) and the positioning assemblies (30) to slide along the elongated slots (13) of the main bracket (10).

Since the guiding protrusions (312) of the connecting panels (31) are mounted on a distal edges of the stationary wings (11), the sliding bracket (20) and the positioning assemblies (30) stably slide along the main bracket (10). While the positioning protrusions (321) of the resilient leaves (32) engage one of the at least one positioning detent (12) of the main bracket (10), the sliding bracket (20) is held in a specific position.

The resilient components (50) are mounted respectively on outer surfaces of the stationary wings (11). Each resilient component (50) may be a torsion spring and has two ends. The ends of the resilient component (32) are connected respectively to a corresponding stationary wing (11) and one of the fasteners (40).

Figure 3:
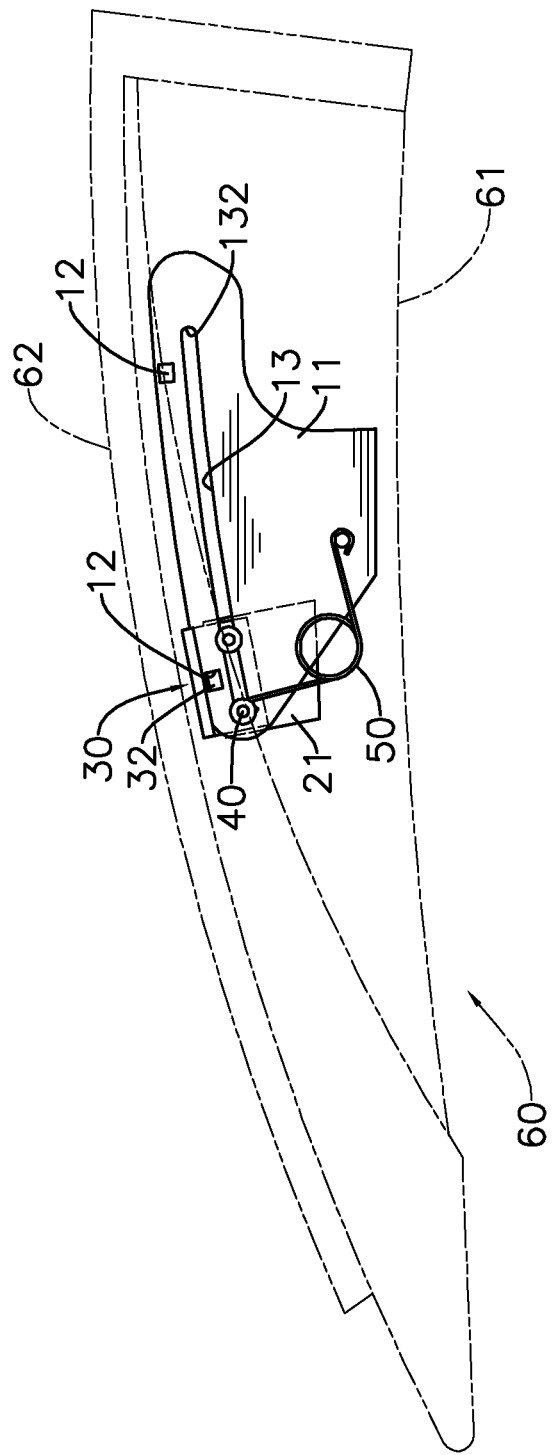
FIG. 3 is a side view of the remote control with the sliding hinge in FIG. 2.

With further reference to FIG. 3, when the sliding bracket (20) is disposed at the first ends (131) of the elongated slots (13) of the main bracket (10), the resilient components (50) push the sliding bracket (20) to retain the sliding bracket (20) securely at the first end (131) of the elongated slot (13). Then, the upper casing (62) is fully closed relative to the lower casing (61).

Figure 4:
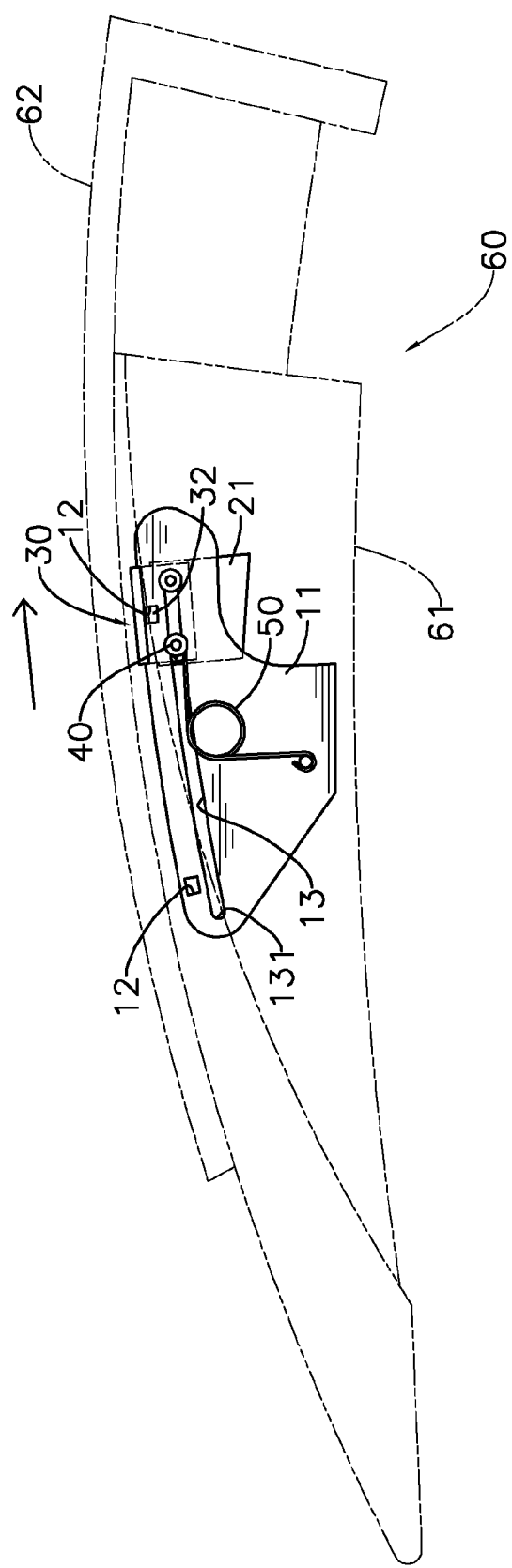
FIG. 4 is an operational side view of the remote control with the sliding hinge in FIG. 2.

With further reference to FIG. 4, when the sliding bracket (20) slides along the elongated slots (13) of the main bracket (10) toward the second ends (132) of the elongated slots (13), the sliding bracket (20) exerts force against elasticity of the resilient components (50). When the sliding bracket (20) approaches the second ends (132) of the elongated slots (13), the elasticity of the resilient components (50) force the sliding bracket (20) to slide toward the second ends (132) of the elongated slots (13) and then retains the sliding bracket (20) securely at the second end (131) of the elongated slot (13). Then, the upper casing (62) is fully open relative to the lower casing (61).

The sliding hinge and the remote control with the sliding hinge as described has the following advantages. The elongated slots (13) of the main bracket (10) and the fasteners (40) limit the sliding bracket (20) and the positioning detents (12) of the main bracket (10) and the resilient leaves (32) hold the sliding bracket (20) in specific positions. Therefore, the lower and the upper casings (61, 62) of the remote control (60) do not collide with each other or with the main and the sliding brackets (10, 20) to prevent localized wear.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A sliding hinge comprising:
    a main bracket having a U-shaped cross-section and two opposite stationary wings, and each stationary wing having
        at least one positioning detent formed in an inner surface of the stationary wing; and
        an elongated slot formed through the stationary wing, adjacent to and along a distal edge of the stationary wing;
    a sliding bracket mounted slidably between the stationary wings of the main bracket, having a U-shaped cross-section and two opposite sliding wings, and each sliding wing having at least one mounting hole formed through the sliding wing and corresponding to the elongated slot of a corresponding stationary wing of the main bracket;
    two positioning assemblies mounted respectively between the stationary wings of the main bracket and the sliding wings of the sliding bracket, and each positioning assembly having
        at least one connecting panel having a connector mounted between a corresponding stationary wing of the main bracket and a corresponding sliding wing of the sliding bracket and having
            at least one through hole formed through the connector of the at least one connecting panel, corresponding to the elongated slot of a corresponding stationary wing and aligning with a corresponding mounting hole of the corresponding sliding wing; and
            at least one mounting recess formed in an outer surface of the connector of the connecting panel; and
        at least one resilient leaf mounted in the mounting recess of the at least one connecting panel and having a positioning protrusion protruding toward the corresponding stationary wing of the main bracket and selectively engaging the at least one positioning detent of the corresponding stationary wing of the main bracket;

multiple fasteners mounted respectively through the mounting holes of the sliding bracket, the through holes of the connecting panels of the positioning assemblies and the elongated slots of the main bracket; and two resilient components mounted respectively on outer surfaces of the stationary wings, and each resilient component having two ends connected respectively to a corresponding stationary wing and one of the fasteners.

2. The sliding hinge as claimed in claim 1, wherein the at least one connecting panel of each positioning assembly further has a guiding protrusion formed on a distal edge toward the outer surface of the connector and mounted on and sliding along the distal edge of the corresponding stationary wing of the main bracket.

3. The sliding hinge as claimed in claim 2, wherein the guiding protrusion of the at least one connecting panel of each positioning assembly further has a guiding recess formed in a lower surface of the guiding protrusion and mounted around the distal edge of the corresponding stationary wing.

4. The sliding hinge as claimed in claim 3, wherein each resilient component is a torsion spring.

5. The sliding hinge as claimed in claim 2, wherein each resilient component is a torsion spring.

6. The sliding hinge as claimed in claim 1, wherein
the at least one positioning detent of each stationary wing of the main bracket is formed through the stationary wing; and
the at least one mounting recess of the at least one connecting panel of each positioning assembly is formed through the connector of the connecting panel.

7. The sliding hinge as claimed in claim 6, wherein each resilient component is a torsion spring.

8. The sliding hinge as claimed in claim 1, wherein each resilient component is a torsion spring.

9. A remote control with a sliding hinge as claimed in claim 1 comprising
a lower casing;
an upper casing;
the main bracket of the sliding hinge is attached to the lower casing of the remote control; and
the sliding bracket is attached to the upper casing of the remote control.

10. The remote control with the sliding hinge as claimed in claim 9, wherein the at least one connecting panel of each positioning assembly further has a guiding protrusion formed on a distal edge toward the outer surface of the connector and mounted on and sliding along the distal edge of the corresponding stationary wing of the main bracket.

11. The remote control with the sliding hinge as claimed in claim 10, wherein the guiding protrusion of the at least one connecting panel of each positioning assembly further has a guiding recess formed in a lower surface of the guiding protrusion and mounted around the distal edge of the corresponding stationary wing.

12. The remote control with the sliding hinge as claimed in claim 11, wherein each resilient component is a torsion spring.

13. The remote control with the sliding hinge as claimed in claim 10, wherein each resilient component is a torsion spring.

14. The remote control with the sliding hinge as claimed in claim 9, wherein
the at least one positioning detent of each stationary wing of the main bracket is formed through the stationary wing; and
the at least one mounting recess of the at least one connecting panel of each positioning assembly is formed through the connector of the connecting panel.

15. The remote control with the sliding hinge as claimed in claim 14, wherein each resilient component is a torsion spring.

16. The remote control with the sliding hinge as claimed in claim 9, wherein each resilient component is a torsion spring.

* * * * *